US012756576B2

(12) United States Patent
Lan et al.

(10) Patent No.: US 12,756,576 B2
(45) Date of Patent: Oct. 6, 2026

(54) VEHICLE SECURE START METHOD AND APPARATUS, ELECTRONIC CONTROL UNIT AND STORAGE MEDIUM

(71) Applicant: CONTEMPORARY AMPEREX TECHNOLOGY (HONG KONG) LIMITED, Hong Kong (CN)

(72) Inventors: Chunshu Lan, Ningde (CN); Tingda Lin, Ningde (CN); Chao Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 555 days.

(21) Appl. No.: 18/185,213

(22) Filed: Mar. 16, 2023

(65) Prior Publication Data

US 2023/0221949 A1 Jul. 13, 2023

Related U.S. Application Data

(63) Continuation of application No. PCT/CN2022/093129, filed on May 16, 2022.

(30) Foreign Application Priority Data

Nov. 29, 2021 (CN) ......................... 202111436999.0

(51) Int. Cl.
*G06F 8/65* (2018.01)
*G06F 21/57* (2013.01)
(Continued)

(52) U.S. Cl.
CPC .......... *H04L 9/3247* (2013.01); *G06F 21/572* (2013.01); *H04L 9/0643* (2013.01); *H04L 2209/84* (2013.01)

(58) Field of Classification Search
None
See application file for complete search history.

(56) References Cited

U.S. PATENT DOCUMENTS

2009/0276617 A1* 11/2009 Grell .................... G06F 21/575 713/2
2017/0180989 A1* 6/2017 Etzel .................... G06F 21/602
(Continued)

FOREIGN PATENT DOCUMENTS

CN 106027260 A 10/2016
CN 106484457 A 3/2017
(Continued)

OTHER PUBLICATIONS

State Intellectual Property Office of China Notice of Grant of Invention Patent Right for Application No. 202111436999.0 Jan. 11, 2024 4 pages (including translation).
(Continued)

*Primary Examiner* — Jeffrey C Pwu
*Assistant Examiner* — Mayasa A. Shaawat
(74) *Attorney, Agent, or Firm* — ANOVA LAW GROUP, PLLC

(57) ABSTRACT

A vehicle secure start method applicable to an electronic control unit of a vehicle includes, after the vehicle is powered on, signing stored first firmware based on a preset symmetric encryption algorithm and a symmetric key to obtain a first signature value, comparing the first signature value with a stored second signature value, and controlling the vehicle to be securely started in response to the first signature value being same as the second signature value. The symmetric key is generated based on a random number generation algorithm when firmware is received for a first time. The second signature value is generated by performing encryption based on the preset symmetric encryption algo-
(Continued)

rithm and the symmetric key when the first firmware is received.

18 Claims, 4 Drawing Sheets

(51) Int. Cl.
*H04L 9/06* (2006.01)
*H04L 9/32* (2006.01)

(56) References Cited

U.S. PATENT DOCUMENTS

2017/0310674 A1 10/2017 Markham
2018/0131522 A1* 5/2018 Lawlis .................. H04L 9/0631
2018/0145991 A1* 5/2018 McCauley ............ H04L 9/0891
2019/0187971 A1 6/2019 Wang et al.
2022/0335132 A1* 10/2022 Thor ..................... H04L 9/3247

FOREIGN PATENT DOCUMENTS

CN 106685653 A 5/2017
CN 109324589 A 2/2019
CN 110221852 A 9/2019
CN 110555309 A 12/2019
CN 110708388 A 1/2020
EP 3291087 A1 3/2018
WO 2017006862 A1 1/2017

OTHER PUBLICATIONS

The Japan Patent Office (JPO) Notification of Reasons for Refusal for Application No. 2022-551382 Jan. 9, 2024 6 Pages (including translation).
The World Intellectual Property Organization (WIPO) International Search Report and Written Opinion for PCT/CN2022/093129 Aug. 29, 2022 12 pages (Including English translation).
The China National Intellectual Property Administration (CNIPA) Notice of First Examination Opinion for CN Application No. 202111436999.0 Sep. 10, 2023 18 Pages (Including English translation).
The European Patent Office (EPO) The Extended Search Report for EP Application No. 22757193.2 Jul. 10, 2023 6 Pages.

* cited by examiner

VEHICLE SECURE START METHOD AND APPARATUS, ELECTRONIC CONTROL UNIT AND STORAGE MEDIUM

CROSS-REFERENCE TO RELATED APPLICATIONS

The present application is a continuation of International Application No. PCT/CN2022/093129, which claims priority to Chinese patent application No. 2021114369990, entitled "Vehicle Secure start Method and Apparatus, Electronic Control Unit and Storage Medium", filed on Nov. 29, 2021, the entire contents of both of which are incorporated herein by reference.

TECHNICAL FIELD

The present application relates to the field of vehicle control technologies, and particularly to a vehicle secure start method and apparatus, an electronic control unit and a storage medium.

BACKGROUND ART

Secure start of a vehicle is mainly used for guaranteeing integrity and authenticity of system software to prevent important image files in a system from being damaged or replaced.

A mainstream security verification method at present is a symmetric encryption algorithm. The symmetric encryption algorithm has a specific process that after powered on, an electronic control unit (ECU) signs firmware using a stored symmetric key to obtain a temporary signature value, then performs comparison to judge whether the temporary signature value is consistent with a stored firmware signature value, and if yes, controls the vehicle to be started securely. The inventor finds in practical research that the symmetric key stored in the electronic control unit is transmitted by an upper computer, a leakage risk of the symmetric key is increased in the process of transmitting the symmetric key by the upper computer, the secure start function is easily broken through by hackers once the symmetric key is leaked, and meanwhile, this mode also requires a manufacturer for fabricating the electronic control unit to invest a large number of manpower and material resources to manage the symmetric key.

SUMMARY

An object of embodiments of the present application is to provide a vehicle secure start method and apparatus, an electronic control unit and a storage medium, so as to solve a leakage problem of a symmetric key and a management problem of the symmetric key.

The disclosure is implemented as follows.

In a first aspect, an embodiment of the present application provides a vehicle secure start method, which is applied to an electronic control unit of a vehicle, the method including: after the vehicle is powered on, signing stored first firmware based on a preset symmetric encryption algorithm and a symmetric key to obtain a first signature value, the symmetric key being generated based on a random number generation algorithm when the firmware is received for the first time; and comparing the first signature value with a stored second signature value, and controlling the vehicle to be securely started when the first signature value is the same as the second signature value, the second signature value being generated after encryption based on the preset symmetric encryption algorithm and the symmetric key when the first firmware is received.

In the embodiment of the present application, the random number generation algorithm is configured in the electronic control unit; when the electronic control unit receives the firmware for the first time (for example, in a configuration process of a manufacturer), the random number generation algorithm is triggered to randomly generate a symmetric key, and the symmetric key is then stored for subsequent secure start control of the vehicle; in this way, the symmetric key may be generated by the electronic control unit, thus avoiding the problem that the symmetric key is transmitted from the outside of the electronic control unit and thus leaked; furthermore, since the symmetric key is randomly generated by the electronic control unit according to the received firmware, the manufacturer for fabricating the electronic control unit is not required to invest a large number of manpower and material resources to manage the symmetric key.

In conjunction with the technical solution of the first aspect, in some possible implementations, before the after the vehicle is powered on, signing stored first firmware based on a preset symmetric encryption algorithm and a symmetric key to obtain a first signature value, the method further includes: when the vehicle is powered on, to-be-updated firmware sent by an upper computer is received, and the to-be-updated firmware is secure firmware, signing the to-be-updated firmware based on the preset symmetric encryption algorithm and the symmetric key to obtain the second signature value, storing the second signature value, and replacing last stored firmware with the to-be-updated firmware, the stored to-be-updated firmware being the first firmware.

In the embodiment of the present application, update of the signature value is triggered only when the to-be-updated firmware is determined to be the secure firmware, thus further improving starting security of the vehicle, and avoiding malicious firmware triggering firmware update of the vehicle.

In conjunction with the technical solution of the first aspect, in some possible implementations, a hash value of a preset public key is stored in advance in the electronic control unit, and the to-be-updated firmware is determined to be the secure firmware by the following steps: receiving the to-be-updated firmware, a target signature value and a target public key which are sent by the upper computer; calculating a hash value of the target public key to obtain a first hash value; when the first hash value is the same as the hash value of the preset public key, decrypting the target signature value based on the target public key to obtain a second hash value, the sameness of the first hash value and the hash value of the preset public key indicating that the target public key is the same as the preset public key, the second hash value being obtained by performing calculation on the target firmware using a hash algorithm, and the target signature value being obtained by encrypting the second hash value by a private key corresponding to the preset public key; calculating a hash value of the to-be-updated firmware to obtain a third hash value; and when the third hash value is the same as the second hash value, determining that the to-be-updated firmware is the secure firmware, the sameness of the second hash value and the third hash value indicating that the to-be-updated firmware is the same as the target firmware.

In the embodiment of the present application, security of the firmware is verified using an asymmetric encryption algorithm (and meanwhile, the to-be-updated firmware and the public key which are sent by the upper computer are verified), thus reducing a risk that the second signature value for secure start is updated due to an attack on the firmware by hackers, and further improving the starting security of the vehicle.

In conjunction with the technical solution of the first aspect, in some possible implementations, a hash value of a preset public key is stored in advance in the electronic control unit, and the to-be-updated firmware is determined to be the secure firmware by the following steps: acquiring the to-be-updated firmware and a target public key; calculating a hash value of the target public key to obtain a first hash value; and when the first hash value is the same as the hash value of the preset public key, determining that the to-be-updated firmware is the secure firmware.

In the embodiment of the present application, the security of the public key is verified using the asymmetric encryption algorithm, and legality of the public key sent by the upper computer may be determined, thus improving the starting security of the vehicle to a certain extent, and avoiding an illegal public key triggering the firmware update of the vehicle. Meanwhile, this mode can also reduce processing pressure of the electronic control unit.

In conjunction with the technical solution of the first aspect, in some possible implementations, the electronic control unit includes a processor; a hardware security module is embedded in the processor; the preset symmetric encryption algorithm is stored in the hardware security module; the storing the second signature value and replacing last stored firmware with the to-be-updated firmware includes: storing the second signature value into the hardware security module, and replacing the last stored firmware in the hardware security module with the to-be-updated firmware.

In the embodiment of the present application, the hardware security module is embedded in the processor of the electronic control unit, and a security level of a storage region of the hardware security module is higher than that of a common storage unit, such that data storage may be securer by storing the second signature value, the to-be-updated firmware and the symmetric key in the hardware security module.

In conjunction with the technical solution of the first aspect, in some possible implementations, the preset encryption algorithm is an AES-CMAC algorithm.

In a second aspect, an embodiment of the present application provides a vehicle secure start apparatus, which is applied to an electronic control unit of a vehicle, the apparatus including: a signing module configured to, after the vehicle is powered on, sign stored first firmware based on a preset symmetric encryption algorithm and a symmetric key to obtain a first signature value, the symmetric key being generated based on a random number generation algorithm when the firmware is received for the first time; and a control module configured to compare the first signature value with a stored second signature value, and control the vehicle to be securely started when the first signature value is the same as the second signature value, the second signature value being generated after encryption based on the preset symmetric encryption algorithm and the symmetric key when the first firmware is received.

In a third aspect, an embodiment of the present application provides an electronic control unit, including: a processor and a memory, the processor being connected with the memory; wherein the memory is configured to store a program; the processor is configured to execute the program stored in the memory to perform the method according to the embodiment of the first aspect and/or the method provided in conjunction with some possible implementations of the embodiment of the first aspect.

In conjunction with the technical solution of the third aspect, in some possible implementations, a hardware security module is embedded in the processor; the preset symmetric encryption algorithm, the second signature value, the first firmware and the symmetric key are stored in the hardware security module.

In a fourth aspect, an embodiment of the present application provides a computer-readable storage medium having a computer program stored thereon, the computer program, when executed by a processor, performing the method according to the embodiment of the first aspect and/or the method provided in conjunction with some possible implementations of the embodiment of the first aspect.

BRIEF DESCRIPTION OF DRAWINGS

Various other advantages and merits will become apparent to those skilled in the art by reading through the following detailed description of some embodiments. Figures are only intended to illustrate some embodiments and not construed as limiting the present application. In all figures, like reference numerals denote like parts. In the drawings.

Figure 1:
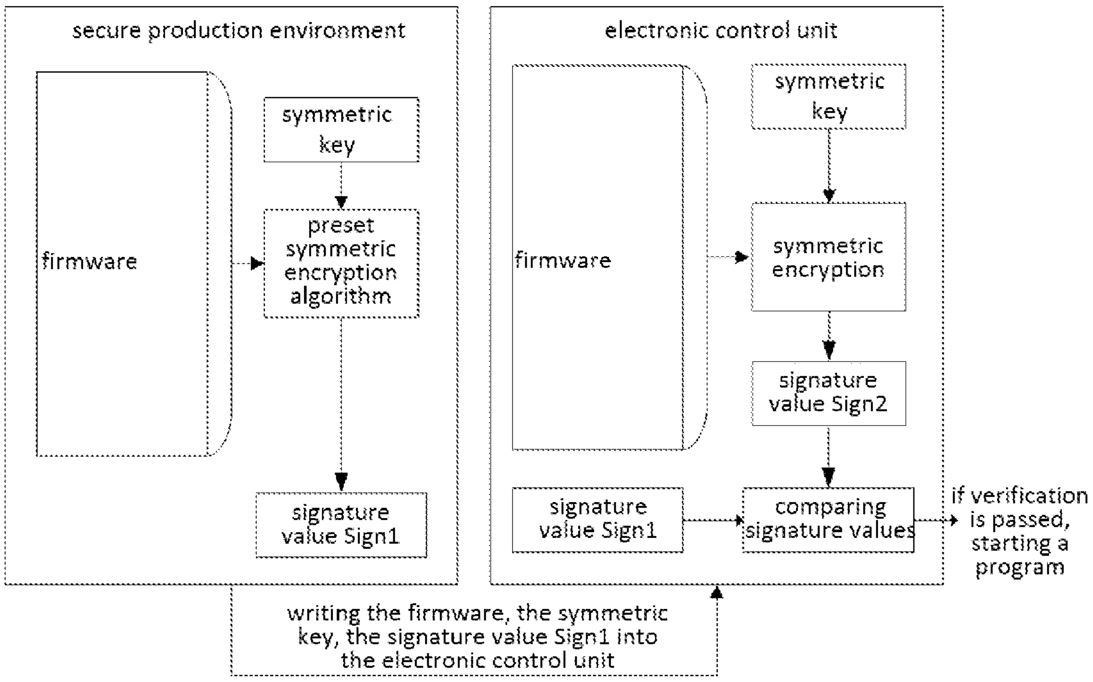
FIG. 1 is a schematic flow chart of vehicle secure start based on a symmetric key.

Reference numerals: 100-electronic control unit; 110-processor; 120-memory; 300-vehicle secure start apparatus; 310-signing module; 320-control module.

DETAILED DESCRIPTION OF EMBODIMENTS

The embodiments of the technical solutions of the present application will be described in detail below with reference to the accompanying drawings. The following embodiments are only used to illustrate the technical solutions of the present application more clearly, and are therefore only used as examples, and cannot be used to limit the protection scope of the present application.

Unless defined otherwise, all technical and scientific terms used herein have the same meanings as are commonly understood by those skilled in the art; the terms used herein are merely for the purpose of describing particular embodiments, and are not intended to limit the present application; the terms "including" and "having" and their any variations in the specification, claims and aforesaid figures of the present application are intended to cover non-exclusive inclusion.

In the description of the embodiments of the present application, the technical terms such as "first", "second", or the like, are only used for distinguishing different objects, and are not intended to indicate or imply relative importance or significance or to imply the number, specific sequence or primary and secondary relationship of indicated technical features. In the description of the embodiments of the present application, "a plurality of" means more than two unless otherwise specified.

The term "embodiment" mentioned herein is intended to mean that specific features, structures, or characteristics described in conjunction with the embodiments may be included in at least one embodiment of the present application. This term "embodiment" appearing at various places throughout the specification does not necessarily refer to the same embodiments, or independent or alternative embodiments that are mutually conflicting with other embodiments. Persons skilled in the art can explicitly and implicitly understand that the embodiments described herein may be combined with other embodiments.

In the description of the embodiments of the present application, the term "and/or" herein only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

In the description of the embodiments of the present application, the term "a plurality of" means two or more than two; similarly, "a plurality of groups" means two or more than two groups, and "a plurality of sheets" means two or more than two sheets.

Reference is made to FIG. 1 which is a schematic flow chart of vehicle secure start based on a symmetric key.

An existing vehicle secure start process based on a symmetric key is described below.

First, a trust chain is constructed:

Step S1: generating a symmetric key in a secure development environment;

Step S2: calculating a signature value of firmware using a preset symmetric encryption algorithm and the symmetric key, and denoting the signature value as sign1; and Step S3: sending the signature value sign1, the symmetric key and the firmware to an electronic control unit by an upper computer.

It should be noted that the construction of the trust chain may occur in a configuration process when a manufacturer fabricates the electronic control unit, or in a subsequent firmware upgrade process of the electronic control unit.

Vehicle secure start process:

Step S4: after a vehicle is powered on, signing, by the electronic control unit, the firmware based on the preset encryption algorithm and the symmetric key, and denoting a signature as sign2; and Step S5: comparing, by the electronic control unit, the signature value sign1 with the signature value sign2, wherein if the two signature values are equal, verification is passed, otherwise, verification fails, and the vehicle is prohibited from being started.

The inventor finds through practical research that the symmetric key stored in the electronic control unit is transmitted by the upper computer, a leakage risk of the symmetric key is increased in the process of transmitting the symmetric key by the upper computer, and the secure start function is easily broken through by hackers once the symmetric key is leaked.

Meanwhile, this mode requires one symmetric key to be shared between the manufacturer and the electronic control unit, which inevitably involves management of the symmetric key by the manufacturer; with a development of the vehicle industry, different vehicle brands and different vehicle models need different symmetric keys for consideration of information security, which further increases a difficulty in management of the symmetric key.

In view of the above problems, the following embodiments are proposed to solve the above problems.

Figure 2:
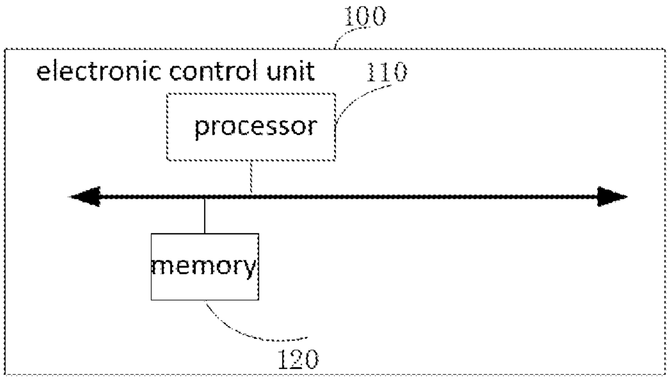
FIG. 2 is a block diagram of an electronic control unit according to an embodiment of the present application.

Reference is made to FIG. 2 which is a schematic block diagram of an electronic control unit 100 to which a vehicle secure start method and apparatus are applied according to an embodiment of the present application.

It should be noted that the electronic control unit 100 is also called a "driving computer" of the vehicle, and is configured to control a driving state of the vehicle and achieve various functions thereof.

Structurally, the electronic control unit 100 may include a processor 110 and a memory 120.

The processor 110 and the memory 120 are electrically connected, directly or indirectly, to implement data transmission or interaction; for example, the elements may be electrically connected to each other via one or more communication buses or signal lines. The vehicle secure start apparatus includes at least one software module which may be stored in the memory 120 or solidified in an operating system (OS) of the electronic control unit 100 in a form of software or firmware. The processor 110 is configured to execute executable modules stored in the memory 120, such as software functional modules, a computer program, or the like, included in the vehicle secure start apparatus, so as to implement the vehicle secure start method. The processor 110 may execute the computer program after receiving an execution instruction.

The processor 110 may be an integrated circuit chip having a signal processing capability. The processor 110 may also be a general-purpose processor, for example, a central processing unit (CPU), a microcontroller unit (MCU), a digital signal processor (DSP), an application specific integrated circuit (ASIC), a discrete gate or transistor logic device, or a discrete hardware component, and may implement or execute the methods, steps, and logic blocks according to the embodiments of the present application. Further, the general-purpose processor may be a microprocessor, any conventional processor, or the like.

Furthermore, a hardware security module (HSM) may be embedded in the processor 110 to achieve the vehicle secure start function.

The memory 120 may be, but is not limited to, a random access memory (RAM), a read only memory (ROM), a programmable read-only memory (PROM), an erasable programmable read-only memory (EPROM), and an electric erasable programmable read-only memory (EEPROM). The memory 120 is configured to storing the program, and the processor 110 executes the program after receiving the execution instruction.

It should be noted that the structure shown in FIG. 2 is only an illustration, and the electronic control unit 100 according to the embodiment of the present application may also have fewer or more components than those shown in FIG. 2, or have a different configuration than that shown in FIG. 2. Furthermore, each component shown in FIG. 2 may be implemented by software, hardware, or a combination thereof.

Figure 3:
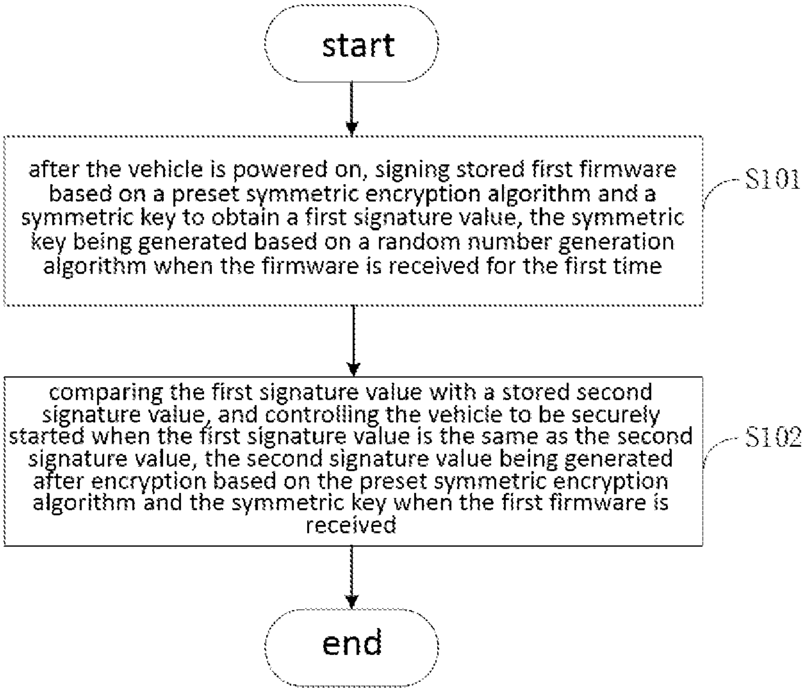
FIG. 3 is a flow chart of a vehicle secure start method according to an embodiment of the present application.

Reference is made to FIG. 3 which is a flow chart illustrating steps of the vehicle secure start method according to the embodiment of the present application, and the method is applied to the electronic control unit 100 shown in FIG. 2. It should be noted that the vehicle secure start method according to the embodiment of the present application is not limited by the sequence shown in FIG. 3 and the following sequence, and the method includes step S101 to step S102.

Step S101: after the vehicle is powered on, signing stored first firmware based on a preset symmetric encryption algorithm and a symmetric key to obtain a first signature value, the symmetric key being generated based on a random number generation algorithm when the firmware is received for the first time.

It should be noted that the electronic control unit is configured to receive the firmware from an upper computer. When receiving the firmware from the upper computer for the first time (for example, in a configuration process of the manufacturer), the electronic control unit randomly generates a symmetric key based on the random number generation algorithm, so as to perform secure start control subsequently.

If the electronic control unit does not receive the firmware sent by the upper computer when powered on, vehicle secure start control is performed, and first, the stored first firmware is signed based on the preset symmetric encryption algorithm and the symmetric key to obtain the first signature value.

The above upper computer may refer to a server, a computer, upper computer software, a terminal device of the manufacturer, or the like, which is not limited in the present application.

In the embodiment of the present application, the preset symmetric encryption algorithm is an AES-CMAC algorithm; certainly, in other embodiments, the preset symmetric encryption algorithm may also be a hash-based message authentication code (HMAC) and other symmetric encryption algorithms, which is not limited in the present application. Since the above symmetric encryption algorithms are all well known in the art, no further explanation is given in the present application.

Step S102: comparing the first signature value with a stored second signature value, and controlling the vehicle to be securely started when the first signature value is the same as the second signature value, the second signature value being generated after encryption based on the preset symmetric encryption algorithm and the symmetric key when the first firmware is received.

Then, the electronic control unit compares the first signature value generated temporarily after the electronic control unit is powered on with the stored second signature value, and when the first signature value is the same as the second signature value, the vehicle is controlled to be started securely. When the first signature value is different from the second signature value, the verification fails, and the vehicle is prohibited from being started.

It should be noted that the second signature value is generated after the electronic control unit receives the first firmware sent by the upper computer and encrypts the first firmware based on the preset symmetric encryption algorithm and the symmetric key. The second signature value is stored in the electronic control unit.

Therefore, in the embodiment of the present application, the random number generation algorithm is configured in the electronic control unit; when the electronic control unit receives the firmware for the first time (for example, in the configuration process of the manufacturer), the random number generation algorithm is triggered to randomly generate the symmetric key, and the symmetric key is then stored for subsequent secure start control of the vehicle; in this way, the symmetric key may be generated by the electronic control unit, thus avoiding the problem that the symmetric key is transmitted from the outside of the electronic control unit and thus leaked; furthermore, since the symmetric key is randomly generated by the electronic control unit according to the received firmware, the manufacturer for fabricating the electronic control unit is not required to invest a large number of manpower and material resources to manage the symmetric key, and meanwhile, an effect that one electronic control unit has one key may be achieved.

Figure 4:
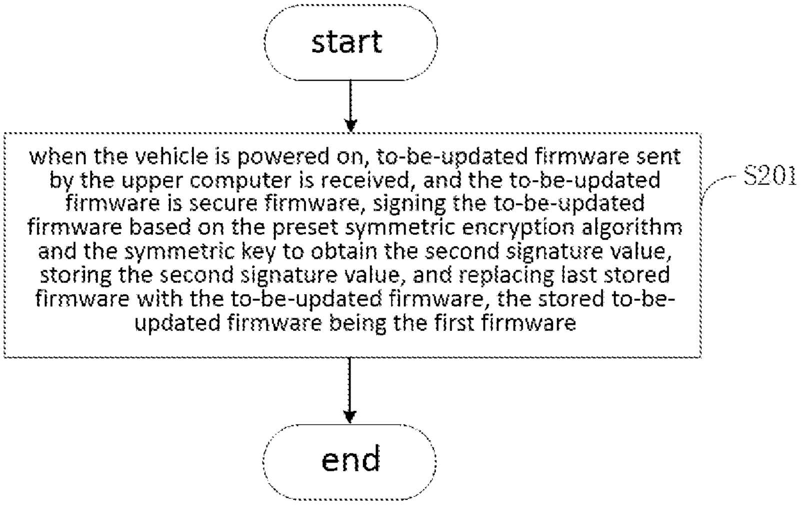
FIG. 4 is a flow chart of another vehicle secure start method according to an embodiment of the present application.

Referring to FIG. 4, as an optional embodiment, a process of triggering update of the electronic control unit specifically includes step S201.

Step S201: when the vehicle is powered on, to-be-updated firmware sent by the upper computer is received, and the to-be-updated firmware is secure firmware, signing the to-be-updated firmware based on the preset symmetric encryption algorithm and the symmetric key to obtain the second signature value, storing the second signature value, and replacing last stored firmware with the to-be-updated firmware, the stored to-be-updated firmware being the first firmware.

When the firmware of the vehicle is required to be updated, the upper computer sends the to-be-updated firmware to the electronic control unit after the vehicle is powered on. When the electronic control unit is powered on for the first time, the manufacturer burns the firmware in the electronic control unit by the upper computer.

Then, the electronic control unit signs the to-be-updated firmware based on the preset symmetric encryption algorithm and the symmetric key to obtain the second signature value. Finally, the second signature value, the to-be-updated firmware and the symmetric key are stored. The to-be-updated firmware stored this time is the first firmware.

In the above embodiment, the update of the signature value is triggered only when the to-be-updated firmware is determined to be the secure firmware, thus further improving starting security of the vehicle, and avoiding malicious firmware triggering firmware update of the vehicle.

It should be noted that the preset symmetric encryption algorithm is pre-configured in the electronic control unit, and as an embodiment, a hardware security module is embedded in a processor in the electronic control unit. The preset symmetric encryption algorithm is configured in the hardware security module. Correspondingly, the electronic control unit may also store the second signature value, the to-be-updated firmware, and the symmetric key in the hardware security module.

A security level of a storage region of the hardware security module is higher than that of a common storage unit, such that data storage may be securer by storing the second signature value, the to-be-updated firmware and the symmetric key in the hardware security module. Meanwhile, the adoption of the mode of embedding the hardware security module may reduce a configuration requirement of the processor, and reduce a starting time of the vehicle. It should be noted that, every time the to-be-updated firmware is received again, the last stored firmware is replaced to ensure that the received to-be-updated firmware is stored.

Figure 5:
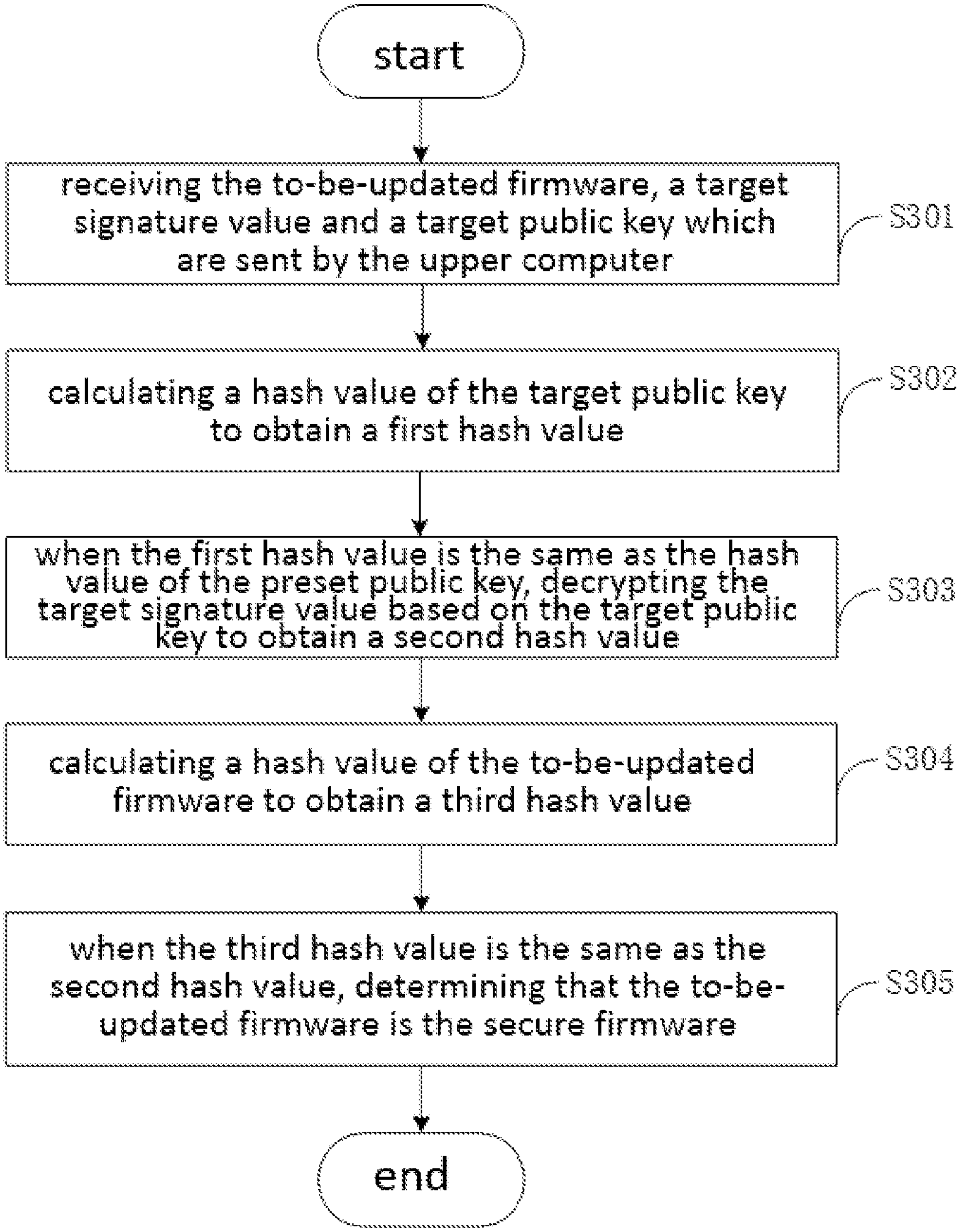
FIG. 5 is a flow chart of verification of to-be-updated firmware according to an embodiment of the present application.

Referring to FIG. 5, optionally, as an embodiment, the electronic control unit stores a hash value of a preset public key in advance; the preset public key is a legal public key, and the step of verifying the to-be-updated firmware may include step S301 to step S305.

Step S301: receiving the to-be-updated firmware, a target signature value and a target public key which are sent by the upper computer.

When needing to update the firmware of the vehicle, the upper computer first configures target firmware and a preset asymmetric key, the preset asymmetric key including the preset public key and a private key corresponding to the preset public key, and the target firmware being the firmware required to be updated. Then, calculation is performed on the target firmware using a hash algorithm to obtain a second hash value, and the second hash value is encrypted based on the private key corresponding to the preset public key to obtain the target signature value.

The verification process of the electronic control unit after the to-be-updated firmware, the target signature value and the target public key are received means that whether the to-be-updated firmware is the target firmware and whether the target public key is a legal public key are verified.

The sameness of the to-be-updated firmware and the target firmware indicates that the to-be-updated firmware is secure, and the difference of the to-be-updated firmware and the target firmware indicates that the to-be-updated firmware is firmware tampered with by hackers. The sameness of the target public key and the preset public key indicates that the target public key is a legal public key, otherwise, the target public key is illegal.

Step S302: calculating a hash value of the target public key to obtain a first hash value.

The electronic control unit first verifies the target public key, and calculates the hash value of the target public key based on the hash algorithm to obtain the first hash value.

Step S303: when the first hash value is the same as the hash value of the preset public key, decrypting the target signature value based on the target public key to obtain a second hash value.

The sameness of the first hash value and the hash value of the preset public key indicates that the target public key is the same as the preset public key, the target public key is a legal public key, the target public key passes verification at this point, the target signature value is then decrypted based on the target public key, and the second hash value is obtained after decryption.

Certainly, the difference between the first hash value and the hash value of the preset public key indicates that the target public key is an illegal public key, subsequent steps are not executed here, and the update of the symmetric key and the update of the signature value are not triggered.

Step S304: calculating a hash value of the to-be-updated firmware to obtain a third hash value.

The electronic control unit verifies the to-be-updated firmware again, and calculates the hash value of the to-be-updated firmware based on the hash algorithm to obtain the third hash value.

Step S305: when the third hash value is the same as the second hash value, determining that the to-be-updated firmware is the secure firmware.

The sameness of the second hash value and the third hash value indicates that the to-be-updated firmware is the same as the target firmware; that is, the to-be-updated firmware is not tampered with by the hackers. On the contrary, the difference between the third hash value and the second hash value indicates that the to-be-updated firmware is tampered with by the hackers, and at this point, the update of the symmetric key and the update of the signature value are not triggered.

Thus, in the embodiment of the present application, security of the firmware is verified using an asymmetric encryption algorithm (and meanwhile, the to-be-updated firmware and the public key which are sent by the upper computer are verified), thus reducing a risk that the second signature value for secure start is updated due to an attack on the firmware by the hackers, and further improving the starting security of the vehicle.

As another embodiment, the electronic control unit stores a hash value of a preset public key in advance; the preset public key is a legal public key, and the step of verifying the to-be-updated firmware may include: acquiring the to-be-updated firmware and a target public key; calculating a hash value of the target public key to obtain a first hash value; and when the first hash value is the same as the hash value of the preset public key, determining that the to-be-updated firmware is secure firmware.

It should be noted that, for this mode, only legality of the target public key is verified, and after the legality of the target public key passes the verification, the to-be-updated firmware is directly determined to be the secure firmware; this mode may also improve the starting safety of the vehicle to a certain extent and avoids an illegal public key triggering the firmware update of the vehicle. Meanwhile, this mode can also reduce processing pressure of the electronic control unit.

Figure 6:
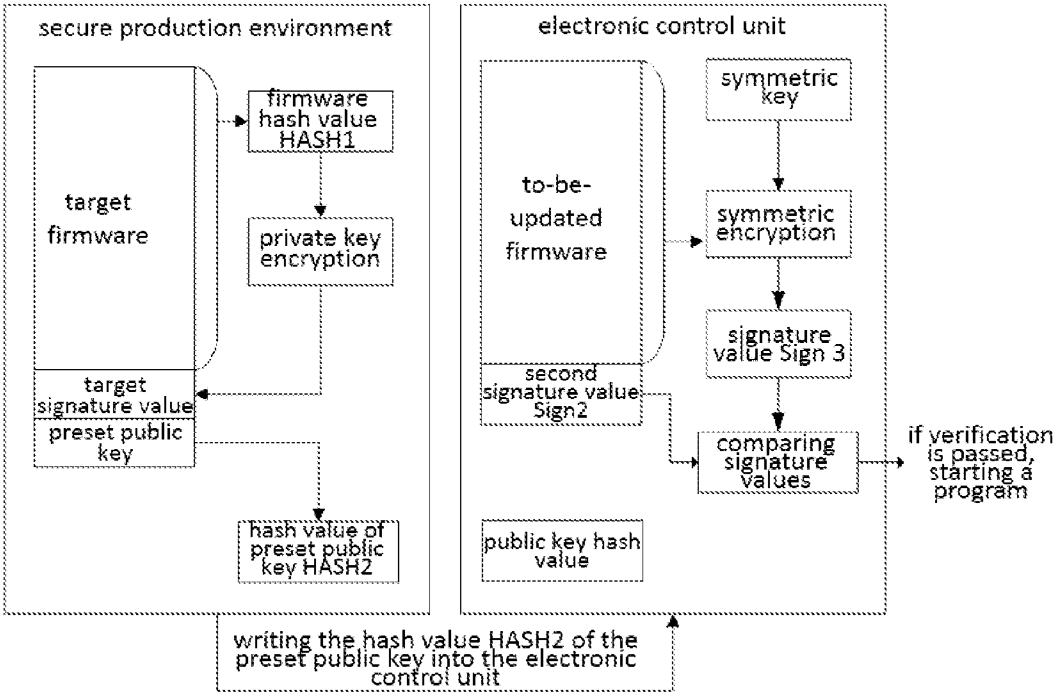
FIG. 6 is a schematic flow chart of vehicle secure start based on a symmetric key according to an embodiment of the present application.

Referring to FIG. 6, the vehicle secure start method according to the embodiment of the present application is described below with reference to a complete example.

First, a trust chain is constructed as follows.

Step S1: generating a preset asymmetric key in a secure development environment, the preset asymmetric key including a preset public key and a private key corresponding to the preset public key.

Step S2: calculating a hash value of target firmware using a hash algorithm, and denoting the hash value as HASH1.

Step S3: calculating a hash value of the preset public key using the hash algorithm, and denoting the hash value as HASH2.

Step S4: encrypting the hash value HASH1 of the target firmware using the private key corresponding to the preset public key to obtain a target signature value, and denoting the target signature value as Sign1.

Step S5: writing the hash value HASH2 of the public key into an electronic control unit. (Public key leakage of the asymmetric key does not affect security of the electronic control unit).

Step S6: when the electronic control unit is powered on, entering Bootloader first. It should be noted that, in an embedded operating system, the Bootloader is a boot program which runs before a kernel of the operating system runs. A hardware device may be initialized, and a memory space map may be established, so as to bring a software and hardware environment of the system to an appropriate state to prepare a correct environment for final invocation of the kernel of the operating system.

Step S7: receiving, by the Bootloader, the to-be-updated firmware, a target signature value and a target public key which are sent by an upper computer.

Step S8: calculating, by the Bootloader, a hash value of the target public key, and denoting the hash value as HASH3. Then, comparison is performed to judge whether the HASH3 is equal to the stored HASH2, equality indicates that the target public key is the same as the preset public key, the target public key is a legal public key, the target public key passes verification at this point, and step S9 is executed. Inequality of the HASH3 and the stored HASH2 indicates that the target public key is an illegal public key, and at this point, subsequent processing is not performed.

Step S9: decrypting, by the Bootloader, the target signature value using the target public key to obtain the hash value HASH1 of the target firmware.

Step S10: calculating, by the Bootloader, a hash value HASH4 of the to-be-updated firmware based on the hash algorithm.

Step S11: judging, by the Bootloader, whether the HASH4 is equal to the HASH1, equality indicating that the to-be-updated firmware is not tampered with by the hackers, a source of the to-be-updated firmware being reliable, and at this point, step S12 being executed. Inequality indicates that the to-be-updated firmware is tampered with by the hackers, and subsequent processing is not performed at this point.

Step S12: generating, by the Bootloader, a symmetric key with a random number generation algorithm and storing the symmetric key.

It should be noted that step S12 is executed only when the firmware is received for the first time, that is, executed once in a configuration process of fabrication of the electronic control unit by a manufacturer. For subsequent firmware update, step S12 is skipped, and step S13 is performed directly.

Step S13: calculating, by the Bootloader, the to-be-updated firmware based on a preset symmetric encryption algorithm and the symmetric key to obtain a second signature value, denoting the second signature value as Sign2, and storing the to-be-updated firmware and the second signature value. At this point, the trust chain construction is completed.

It should be noted that steps S1 to S5 and S12 in the construction process of the trust chain occur in the configuration process of fabrication of the electronic control unit by the manufacturer. The steps S6 to S11 and S13 may occur in the configuration process of fabrication of the electronic control unit by the manufacturer, such as first configuration of the firmware by the manufacturer, or occur in a subsequent upgrade process of the firmware of the electronic control unit, such as a subsequent upgrade process of the firmware by the manufacturer.

Vehicle secure start process is as follows.

Step S14: after a vehicle is powered on again, signing, by the electronic control unit, the stored firmware based on the preset encryption algorithm and the symmetric key, and denoting a signature as sign3.

Step S15: comparing, by the electronic control unit, the signature value sign3 with the stored second signature value sign2, wherein if the two signature values are equal, verification is passed, otherwise, verification fails, and the vehicle is prohibited from being started.

It should be noted that, every time the electronic control unit acquires new to-be-updated firmware, the electronic control unit may replace the previous firmware; if the currently stored firmware is the first firmware, and the to-be-updated firmware is acquired subsequently, the first firmware is deleted, and the acquired to-be-updated firmware is stored, and at this point, the to-be-updated firmware serves as a second firmware; the process is repeated to store a third firmware, a fourth firmware, and a fifth firmware.

Figure 7:
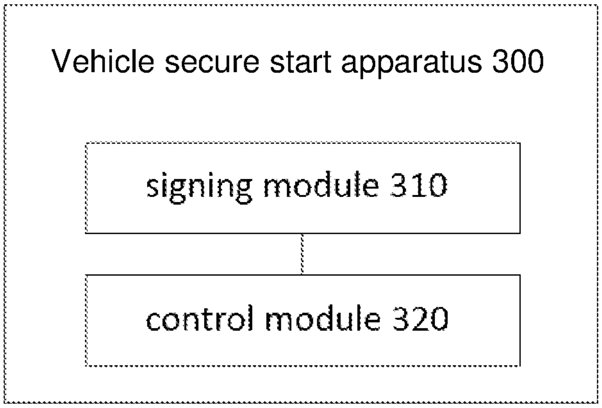
FIG. 7 is a block diagram of a vehicle secure start apparatus according to an embodiment of the present application.

Referring to FIG. 7, based on the same inventive concept, an embodiment of the present application further provides a vehicle secure start apparatus 300, which includes: a signing module 310 and a control module 320.

The signing module 310 is configured to, after a vehicle is powered on, sign stored first firmware based on a preset symmetric encryption algorithm and a symmetric key to obtain a first signature value, the symmetric key being generated based on a random number generation algorithm when the firmware is received for the first time.

The control module 320 is configured to compare the first signature value with a stored second signature value, and control the vehicle to be securely started when the first signature value is the same as the second signature value, the second signature value being generated after encryption based on the preset symmetric encryption algorithm and the symmetric key when the first firmware is received.

Optionally, the vehicle secure start apparatus 300 further includes a storage module.

The storage module is configured to, when the vehicle is powered on, to-be-updated firmware sent by an upper computer is received, and the to-be-updated firmware is secure firmware, sign the to-be-updated firmware based on the preset symmetric encryption algorithm and the symmetric key to obtain the second signature value, store the second signature value, and replace last stored firmware with the to-be-updated firmware, the stored to-be-updated firmware being the first firmware.

Optionally, the electronic control unit stores a hash value of a preset public key in advance, and the vehicle secure start apparatus 300 further includes a verification module.

The verification module is configured to: receive the to-be-updated firmware, a target signature value and a target public key which are sent by the upper computer; calculate a hash value of the target public key to obtain a first hash value; when the first hash value is the same as the hash value of the preset public key, decrypt the target signature value based on the target public key to obtain a second hash value, the sameness of the first hash value and the hash value of the preset public key indicating that the target public key is the same as the preset public key, the second hash value being obtained by performing calculation on the target firmware using a hash algorithm, and the target signature value being obtained by encrypting the second hash value by a private key corresponding to the preset public key; calculate a hash value of the to-be-updated firmware to obtain a third hash value; and when the third hash value is the same as the second hash value, determine that the to-be-updated firmware is the secure firmware, the sameness of the second hash value and the third hash value indicating that the to-be-updated firmware is the same as the target firmware.

Optionally, the verification module may be further configured to: acquire the to-be-updated firmware and a target public key; calculate a hash value of the target public key to obtain a first hash value; and when the first hash value is the same as the hash value of the preset public key, determine that the to-be-updated firmware is the secure firmware.

Optionally, the electronic control unit includes a processor; a hardware security module is embedded in the processor; the preset symmetric encryption algorithm is stored in the hardware security module; correspondingly, the storage module is specifically configured to store the second signature value in the hardware security module, and replace the last stored firmware in the hardware security module with the to-be-updated firmware.

It should be noted that persons skilled in the art may clearly understand that, for the purpose of convenient and brief description, for a detailed working process of the foregoing system, apparatus, and unit, reference may be made to a corresponding process in the foregoing method embodiment, and details are not repeated herein.

Based on the same inventive concept, an embodiment of the present application further provides a computer-readable storage medium having a computer program stored thereon, the computer program, when executed, performing the method according to the above embodiment.

The storage medium may be any available medium which may be accessed by a computer or a data storage device, such as a server, a data center, or the like, including one or more integrated available media. The available medium may be a magnetic medium (for example, a floppy disk, a hard disk, magnetic tape), an optical medium (for example, DVD), or a semiconductor medium (for example, a solid state disk (SSD)), or the like.

In the embodiments provided in the present application, it should be understood that the disclosed apparatus and method may be implemented in other manners. The described apparatus embodiment is only exemplary. For example, the unit division is only logical function division and may be other division in actual implementation. For another example, a plurality of units or components may be combined or integrated into another system, or some features may be ignored or not performed. In addition, the displayed or discussed mutual couplings or direct couplings or communication connections may be implemented through some communication interfaces. The indirect couplings or communication connections between the apparatuses or units may be implemented in electronic, mechanical or other forms.

In addition, the units described as separate parts may or may not be physically separate, and parts displayed as units may or may not be physical units, may be located in one position, or may be distributed on a plurality of network units. A part or all of the units may be selected according to an actual need to achieve the objectives of the solutions in the embodiments.

Further, the respective functional modules in the embodiments of the present application can be integrated to form an independent part, or can exist independently in a form of single module, or can be integrated, in a form of two or more modules, to form an independent part.

Finally, it should be noted that the above embodiments are only used to illustrate the technical solutions of the present application, not to limit the present application; although the present application is described in detail with reference to the above embodiments, those having ordinary skill in the art should understand that they still can modify technical solutions recited in the aforesaid embodiments or equivalently replace partial or all technical features therein; these modifications or substitutions do not make essence of corresponding technical solutions depart from the scope of technical solutions of embodiments of the present application, and all of them should be included in the scope of the claims and description of the present application. Particularly, as long as structural conflicts do not exist, all technical features mentioned in all the embodiments may be combined together in any mode. The present application is not limited to the specific embodiments disclosed in the description, but includes all technical solutions falling into the scope of the claims.

What is claimed is:

1. A vehicle secure start method, applicable to an electronic control unit of a vehicle, the method comprising:

after the vehicle is powered on, signing stored first firmware based on a predetermined symmetric encryption algorithm and a symmetric key to obtain a first signature value, wherein the symmetric key was generated at the electronic control unit based on a random number generation algorithm when initial firmware was initially received at the electronic control unit for a first time without receiving the symmetric key from an upper computer;

comparing the first signature value with a stored second signature value, wherein the second signature value was generated at the electronic control unit by performing encryption based on the predetermined symmetric encryption algorithm and the symmetric key when the first firmware was initially received at the electronic control unit;

controlling the vehicle to be securely started in response to the first signature value being same as the second signature value; and prohibiting the vehicle from being started in response to the first signature value not being the same as the second signature value.

2. The method according to claim 1, further comprising, before signing the stored first firmware based on the predetermined symmetric encryption algorithm and the symmetric key to obtain the first signature value:

when the vehicle is powered on and to-be-stored updated firmware sent by an upper computer is received, and in response to the to-be-stored updated firmware being secure, signing the to-be-stored updated firmware based on the predetermined symmetric encryption algorithm and the symmetric key to obtain the second signature value, storing the second signature value, and replacing last stored firmware with the to-be-stored updated firmware as the first firmware.

3. The method according to claim 2, wherein:

a hash value of a preset public key is stored in advance in the electronic control unit; and the to-be-stored updated firmware is determined to be secure by following:

receiving the to-be-stored updated firmware, a target signature value, and a target public key that are sent by the upper computer;

calculating a hash value of the target public key to obtain a first hash value;

in response to the first hash value being same as the hash value of the preset public key, decrypting the target signature value based on the target public key to obtain a second hash value, wherein:

the first hash value being same as the hash value of the preset public key indicates that the target public key is same as the preset public key;

the second hash value is obtained by performing calculation on authentic firmware using a hash algorithm; and the target signature value is obtained by encrypting the second hash value via a private key corresponding to the preset public key;

calculating a hash value of the to-be-stored updated firmware to obtain a third hash value; and in response to the third hash value being same as the second hash value, determining that the to-be-stored updated firmware is secure, the second hash value being same as the third hash value indicating that the to-be-stored updated firmware is same as the authentic firmware.

4. The method according to claim 2, wherein:

a hash value of a preset public key is stored in advance in the electronic control unit; and the to-be-stored updated firmware is determined to be secure by following:

acquiring the to-be-stored updated firmware and a target public key;

calculating a hash value of the target public key; and
in response to the hash value of the target public key being same as the hash value of the preset public key, determining that the to-be-stored updated firmware is secure.

5. The method according to claim 2, wherein:
the electronic control unit comprises a processor;
a hardware security module is embedded in the processor;
the predetermined symmetric encryption algorithm is stored in the hardware security module; and
storing the second signature value and replacing the last stored firmware with the to-be-stored updated firmware comprises:
storing the second signature value into the hardware security module, and replacing the last stored firmware in the hardware security module with the to-be-stored updated firmware.

6. The method according to claim 1, wherein the predetermined symmetric encryption algorithm is an AES-CMAC algorithm.

7. An electronic control unit, comprising:
a memory storing a program; and
a processor connected to the memory and configured to execute the program to:
after a vehicle on which the electronic control unit is installed is powered on, sign stored first firmware based on a predetermined symmetric encryption algorithm and a symmetric key to obtain a first signature value, wherein the symmetric key was generated at the electronic control unit based on a random number generation algorithm when initial firmware was initially received at the electronic control unit for a first time without receiving the symmetric key from an upper computer;
compare the first signature value with a stored second signature value, wherein the second signature value was generated at the electronic control unit by performing encryption based on the predetermined symmetric encryption algorithm and the symmetric key when the first firmware was initially received at the electronic control unit;
control the vehicle to be securely started in response to the first signature value being same as the second signature value; and
prohibit the vehicle from being started in response to the first signature value not being the same as the second signature value.

8. The electronic control unit according to claim 7, wherein the processor is further configured to execute the program to, before signing the stored first firmware based on the predetermined symmetric encryption algorithm and the symmetric key to obtain the first signature value:
when the vehicle is powered on and to-be-stored updated firmware sent by an upper computer is received, and in response to the to-be-stored updated firmware being secure, sign the to-be-stored updated firmware based on the predetermined symmetric encryption algorithm and the symmetric key to obtain the second signature value, store the second signature value, and replace last stored firmware with the to-be-stored updated firmware as the first firmware.

9. The electronic control unit according to claim 8, wherein:
a hash value of a preset public key is stored in advance in the electronic control unit; and
the to-be-stored updated firmware is determined to be secure by following:
receiving the to-be-stored updated firmware, a target signature value, and a target public key that are sent by the upper computer;
calculating a hash value of the target public key to obtain a first hash value;
in response to the first hash value being same as the hash value of the preset public key, decrypting the target signature value based on the target public key to obtain a second hash value, wherein:
the first hash value being same as the hash value of the preset public key indicates that the target public key is same as the preset public key;
the second hash value is obtained by performing calculation on authentic firmware using a hash algorithm; and
the target signature value is obtained by encrypting the second hash value via a private key corresponding to the preset public key;
calculating a hash value of the to-be-stored updated firmware to obtain a third hash value; and
in response to the third hash value being same as the second hash value, determining that the to-be-stored updated firmware is secure, the second hash value being same as the third hash value indicating that the to-be-stored updated firmware is same as the authentic firmware.

10. The electronic control unit according to claim 8, wherein:
a hash value of a preset public key is stored in advance in the electronic control unit; and
the to-be-stored updated firmware is determined to be secure by following:
acquiring the to-be-stored updated firmware and a target public key;
calculating a hash value of the target public key; and
in response to the hash value of the target public key being same as the hash value of the preset public key, determining that the to-be-stored updated firmware is secure.

11. The electronic control unit according to claim 7, wherein the predetermined symmetric encryption algorithm is an AES-CMAC algorithm.

12. The electronic control unit according to claim 7, wherein:
a hardware security module is embedded in the processor; and
the predetermined symmetric encryption algorithm, the second signature value, the first firmware and the symmetric key are stored in the hardware security module.

13. A non-transitory computer-readable storage medium, storing a computer program that, when executed by a processor, causes the processor to:
after a vehicle on which the electronic control unit is installed is powered on, sign stored first firmware based on a predetermined symmetric encryption algorithm and a symmetric key to obtain a first signature value, wherein the symmetric key was generated at the electronic control unit based on a random number generation algorithm when initial firmware was initially received at the electronic control unit for a first time without receiving the symmetric key from an upper computer;
compare the first signature value with a stored second signature value, wherein the second signature value was generated at the electronic control unit by performing encryption based on the predetermined symmetric encryption algorithm and the symmetric key when the first firmware was initially received at the electronic control unit;

control the vehicle to be securely started in response to the first signature value being same as the second signature value; and prohibit the vehicle from being started in response to the first signature value not being the same as the second signature value.

14. The storage medium according to claim 13, wherein the computer program further causes the processor to, before signing the stored first firmware based on the predetermined symmetric encryption algorithm and the symmetric key to obtain the first signature value:

when the vehicle is powered on and to-be-stored updated firmware sent by an upper computer is received, and in response to the to-be-stored updated firmware being secure, sign the to-be-stored updated firmware based on the predetermined symmetric encryption algorithm and the symmetric key to obtain the second signature value, store the second signature value, and replace last stored firmware with the to-be-stored updated firmware as the first firmware.

15. The storage medium according to claim 14, wherein:

a hash value of a preset public key is stored in advance in the electronic control unit; and the to-be-stored updated firmware is determined to be secure by following:

receiving the to-be-stored updated firmware, a target signature value, and a target public key that are sent by the upper computer;

calculating a hash value of the target public key to obtain a first hash value;

in response to the first hash value being same as the hash value of the preset public key, decrypting the target signature value based on the target public key to obtain a second hash value, wherein:

the first hash value being same as the hash value of the preset public key indicates that the target public key is same as the preset public key;

the second hash value is obtained by performing calculation on authentic firmware using a hash algorithm; and the target signature value is obtained by encrypting the second hash value via a private key corresponding to the preset public key;

calculating a hash value of the to-be-stored updated firmware to obtain a third hash value; and in response to the third hash value being same as the second hash value, determining that the to-be-stored updated firmware is secure, the second hash value being same as the third hash value indicating that the to-be-stored updated firmware is same as the authentic firmware.

16. The storage medium according to claim 14, wherein:

a hash value of a preset public key is stored in advance in the electronic control unit; and the to-be-stored updated firmware is determined to be secure by following:

acquiring the to-be-stored updated firmware and a target public key;

calculating a hash value of the target public key; and in response to the hash value of the target public key being same as the hash value of the preset public key, determining that the to-be-stored updated firmware is secure.

17. The storage medium according to claim 13, wherein the predetermined symmetric encryption algorithm is an AES-CMAC algorithm.

18. The storage medium according to claim 13, wherein:

a hardware security module is embedded in the processor; and the predetermined symmetric encryption algorithm, the second signature value, the first firmware and the symmetric key are stored in the hardware security module.

* * * * *